(12) United States Patent
Tu et al.

(10) Patent No.: US 10,141,019 B2
(45) Date of Patent: Nov. 27, 2018

(54) OPTICAL DISK DRIVE

(71) Applicant: Acer Incorporated, New Taipei (TW)

(72) Inventors: Chih-Kai Tu, New Taipei (TW);
Ming-Cheng Wu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/842,888

(22) Filed: Dec. 15, 2017

(65) Prior Publication Data

US 2018/0190319 A1    Jul. 5, 2018

(30) Foreign Application Priority Data

Dec. 29, 2016 (TW) .............................. 105143787 A

(51) Int. Cl.
*G11B 17/056* (2006.01)
*G11B 17/04* (2006.01)
*G11B 33/02* (2006.01)
*G11B 33/12* (2006.01)

(52) U.S. Cl.
CPC ........ *G11B 17/0407* (2013.01); *G11B 17/056* (2013.01); *G11B 33/027* (2013.01); *G11B 33/12* (2013.01)

(58) Field of Classification Search
None
See application file for complete search history.

(56) References Cited

U.S. PATENT DOCUMENTS

| 2006/0195852 A1* | 8/2006 | Shimizu ............. G11B 17/0405 |
| | | 720/647 |
| 2008/0037202 A1* | 2/2008 | Shinohara .......... G11B 17/0405 |
| | | 361/679.01 |

FOREIGN PATENT DOCUMENTS

| JP | 08129816 A | * | 5/1996 | |
| JP | 2000331407 A | * | 11/2000 | .......... G11B 17/047 |
| JP | 2008077784 A | * | 4/2008 | |
| TW | I479526 | | 4/2015 | |

* cited by examiner

*Primary Examiner* — William J Klimowicz
(74) *Attorney, Agent, or Firm* — JCIPRNET

(57) ABSTRACT

An optical disc drive (ODD) including a housing, a tray, a panel, a first linkage, and a second linkage is provided. The tray is movably disposed at the housing to move into or move out of the housing. The panel is connected to the tray and located at a side of the housing. The first linkage is rotatably disposed on the panel and located between the housing and the panel. The second linkage is rotatably disposed on the panel and located between the first linkage and the panel. By rotating the first linkage with respect to the panel in a first rotating direction, the second linkage is pushed by the first linkage and rotates with respect to the panel in a second rotating direction opposite to the first rotating direction so as to actuate the tray to move out of the housing.

10 Claims, 6 Drawing Sheets

OPTICAL DISK DRIVE

CROSS-REFERENCE TO RELATED APPLICATION

This application claims the priority benefit of Taiwan application serial no. 105143787, filed on Dec. 29, 2016. The entirety of the above-mentioned patent application is hereby incorporated by reference herein and made a part of this specification.

FIELD OF THE INVENTION

The invention relates to an optical disk drive (ODD). More particularly, the invention relates to an ODD having a compact and intact appearance.

DESCRIPTION OF RELATED ART

In an existing ODD, a panel of the ODD is usually configured with an opening hole, and a button used to actuate the electronic switch of the ODD is disposed in the opening hole. A user may press the button, and that the button moves into the ODD to actuate the electronic switch. As such, the tray of the ODD moves out of the casing of the electronic device (e.g., a host of a desktop computer or a notebook computer). Nevertheless, the button disposed in the opening hole located on the panel usually protrudes from the panel. The integrity of the appearance of the ODD is unable to be maintained intact; moreover, dust from external environment easily enters into the ODD through the opening hole. The dust accumulated inside the ODD may affect normal operations of the ODD or may even lead to malfunctions or damages of the ODD.

SUMMARY OF THE INVENTION

The invention provides an optical disk drive (ODD) which is able to retain the integrity of the appearance.

In an embodiment of the invention, an ODD includes a housing, a tray, a panel, a first linkage, and a second linkage. The tray is movably disposed at the housing to move into or move out of the housing. The panel is connected to the tray and located at a side of the housing. The first linkage is rotatably disposed on the panel and located between the housing and the panel. The second linkage is rotatably disposed on the panel and located between the first linkage and the panel. By rotating the first linkage with respect to the panel in a first rotating direction, the second linkage is pushed by the first linkage and rotates with respect to the panel in a second rotating direction opposite to the first rotating direction so as to actuate the tray to move out of the housing.

In view of the foregoing, in the ODD provided by the embodiments of the invention, the first linkage drives the second linkage to rotate with respect to the panel, and that the tray is actuated by the second linkage and moves out of the housing. Compared to existing ODDs, in the ODD provided by the embodiments of the invention, an opening hole configured to accommodate a button is not required. Thereby, the appearance of the ODD remains intact; moreover, dust from external environment is prevented from entering into the ODD to affect normal operations of the ODD.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
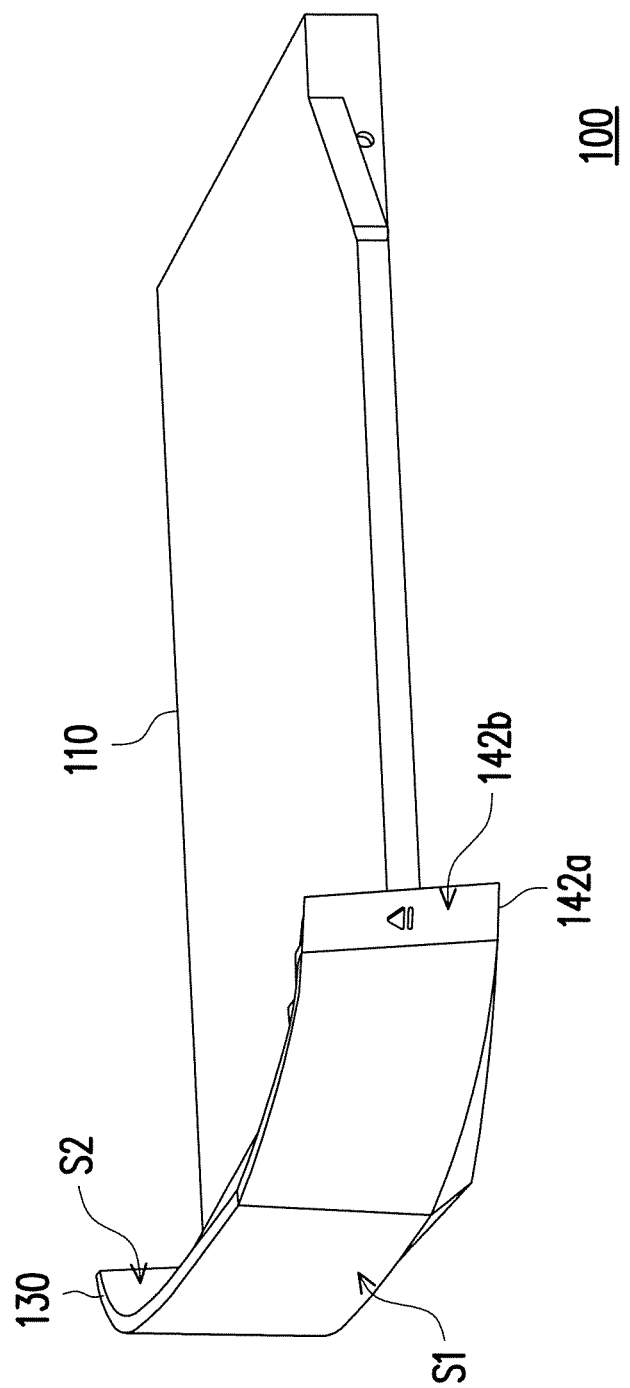
FIG. 1 is a schematic view of an optical disk drive (ODD) according to an embodiment of the invention.

FIG. 1 is a schematic view of an optical disk drive (ODD) according to an embodiment of the invention. Referring to FIG. 1, in the embodiment, an optical disk drive 100 may be used to read data from and write data to a compact disk (CD), a digital video disk (DVD), or other types of disks and is adapted to be assembled to a casing of an electronic device (e.g., a host of a desktop computer or a notebook computer).

Figure 2:
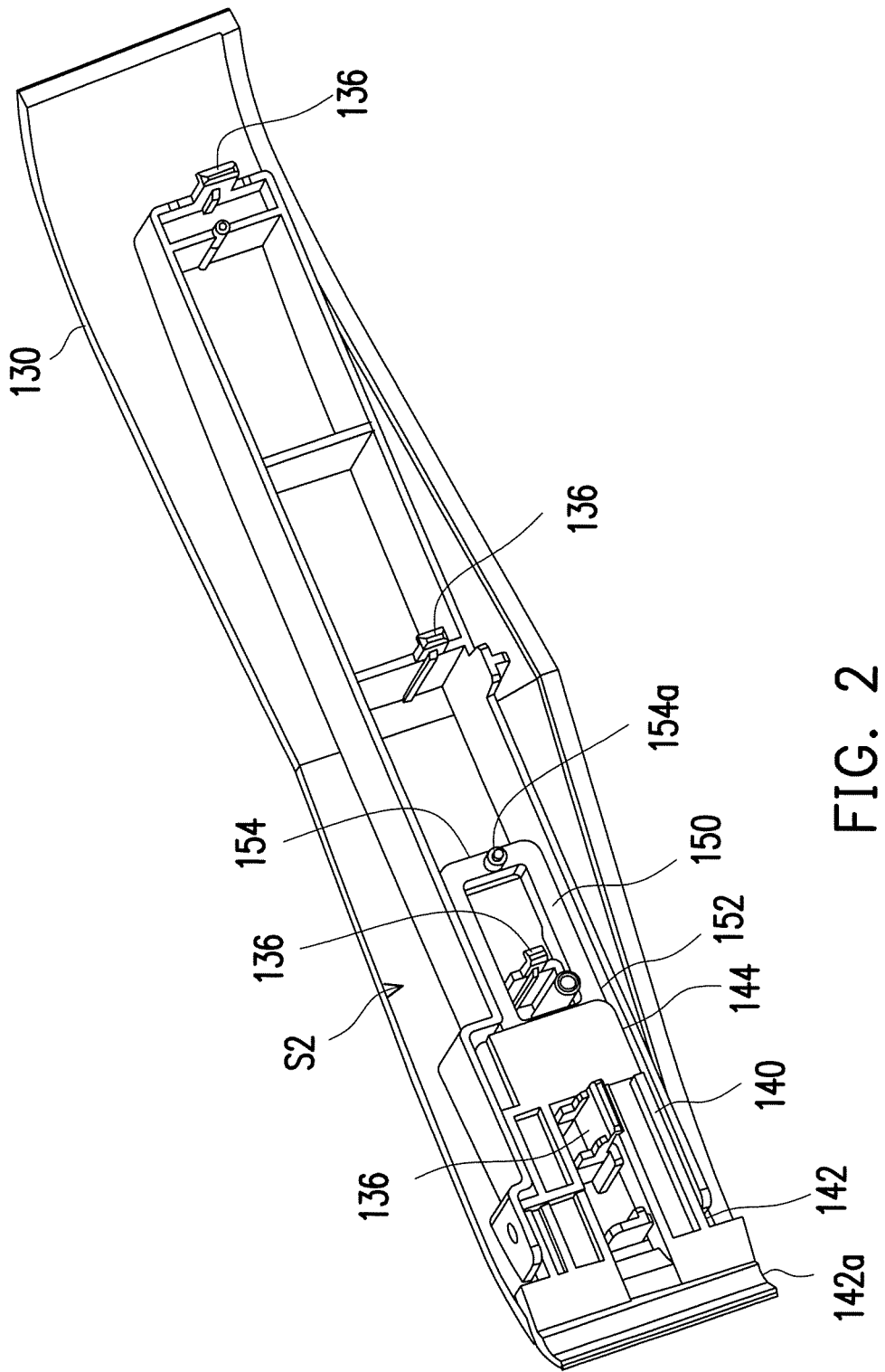
FIG. 2 is a schematic view of a panel in FIG. 1 from another view angle.
Figure 3:
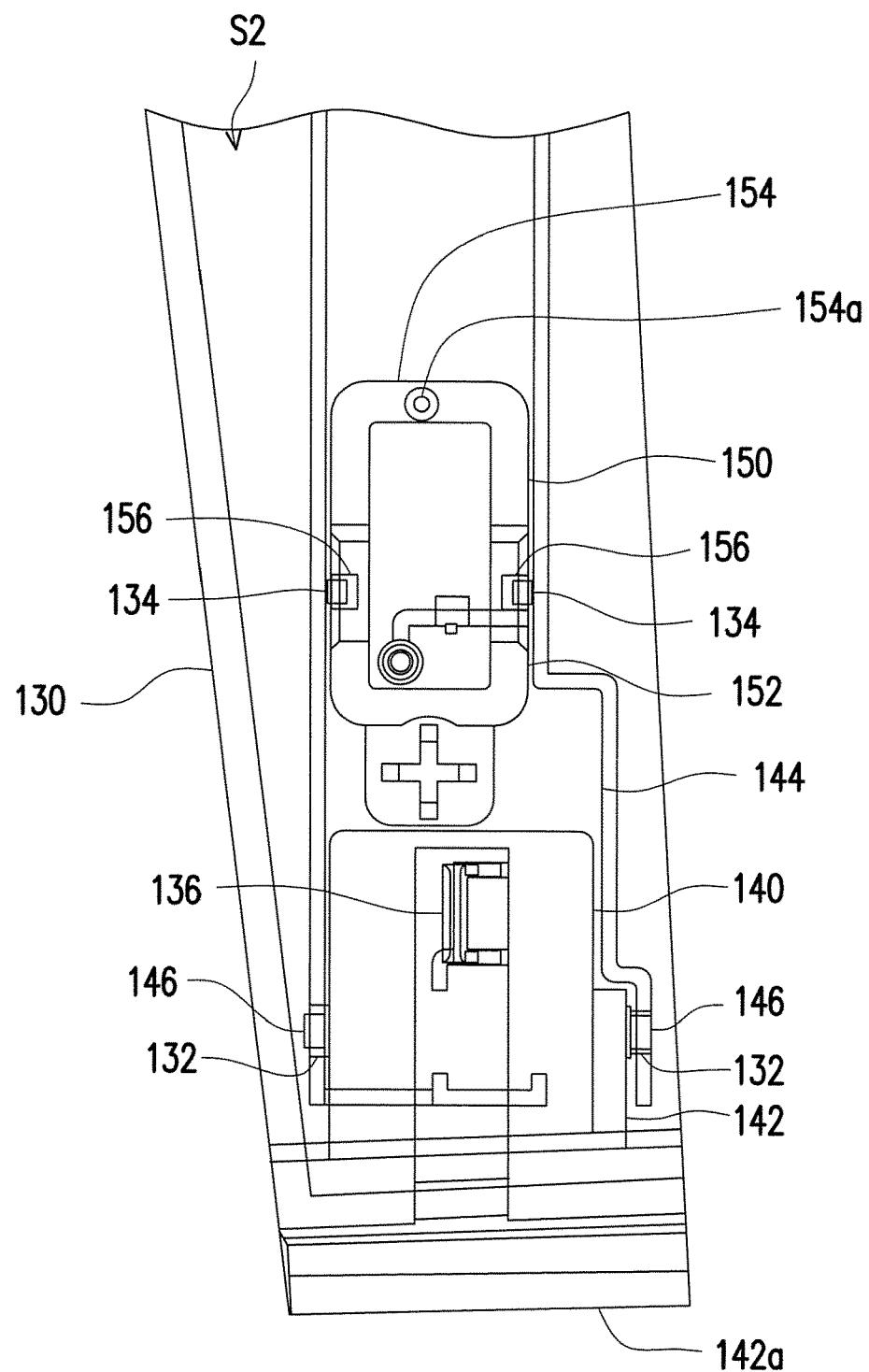
FIG. 3 is a schematic front view of a portion of a panel in FIG. 2.
Figure 4:
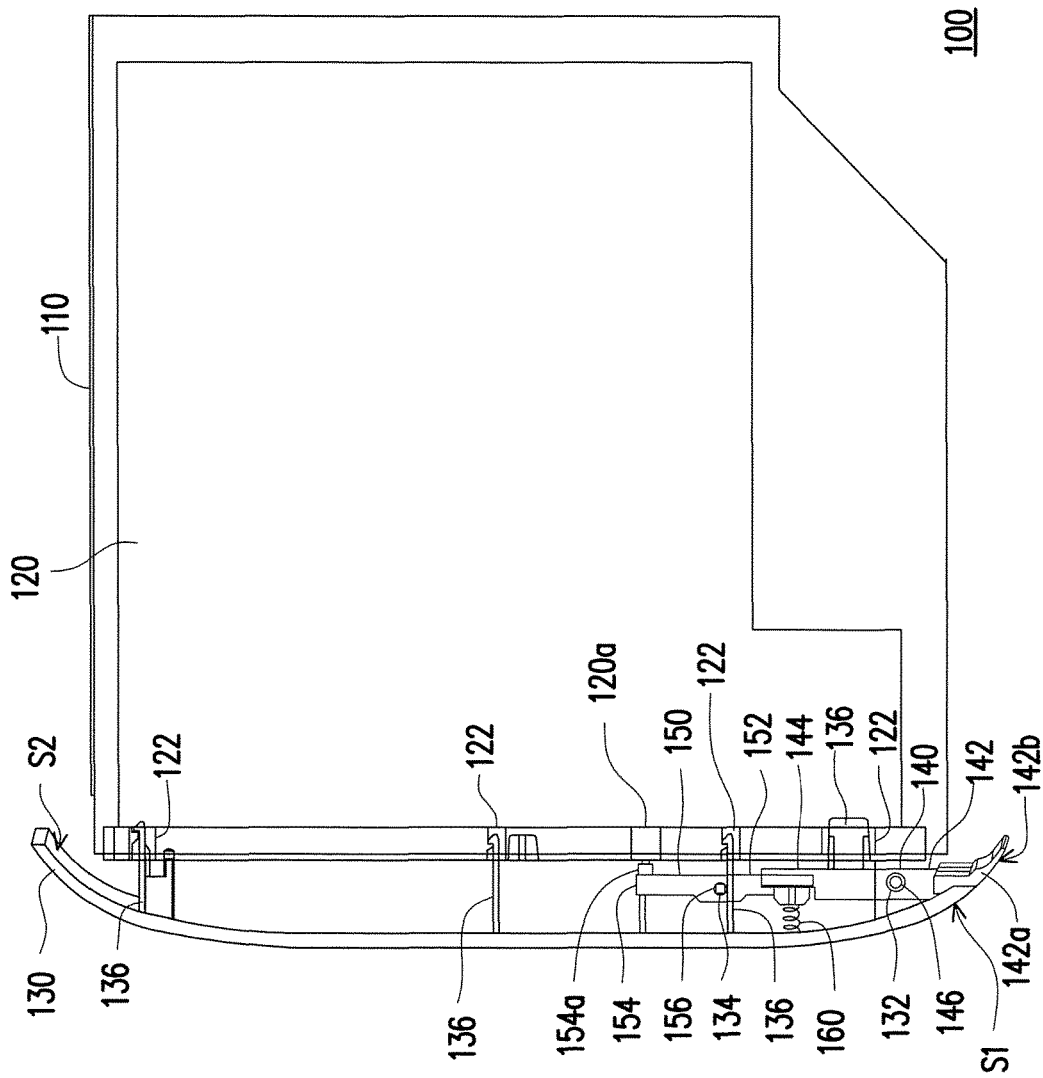
FIG. 4 to FIG. 6 are schematic top views of a process of a tray in FIG. 1 moves out of a housing.
Figure 5:
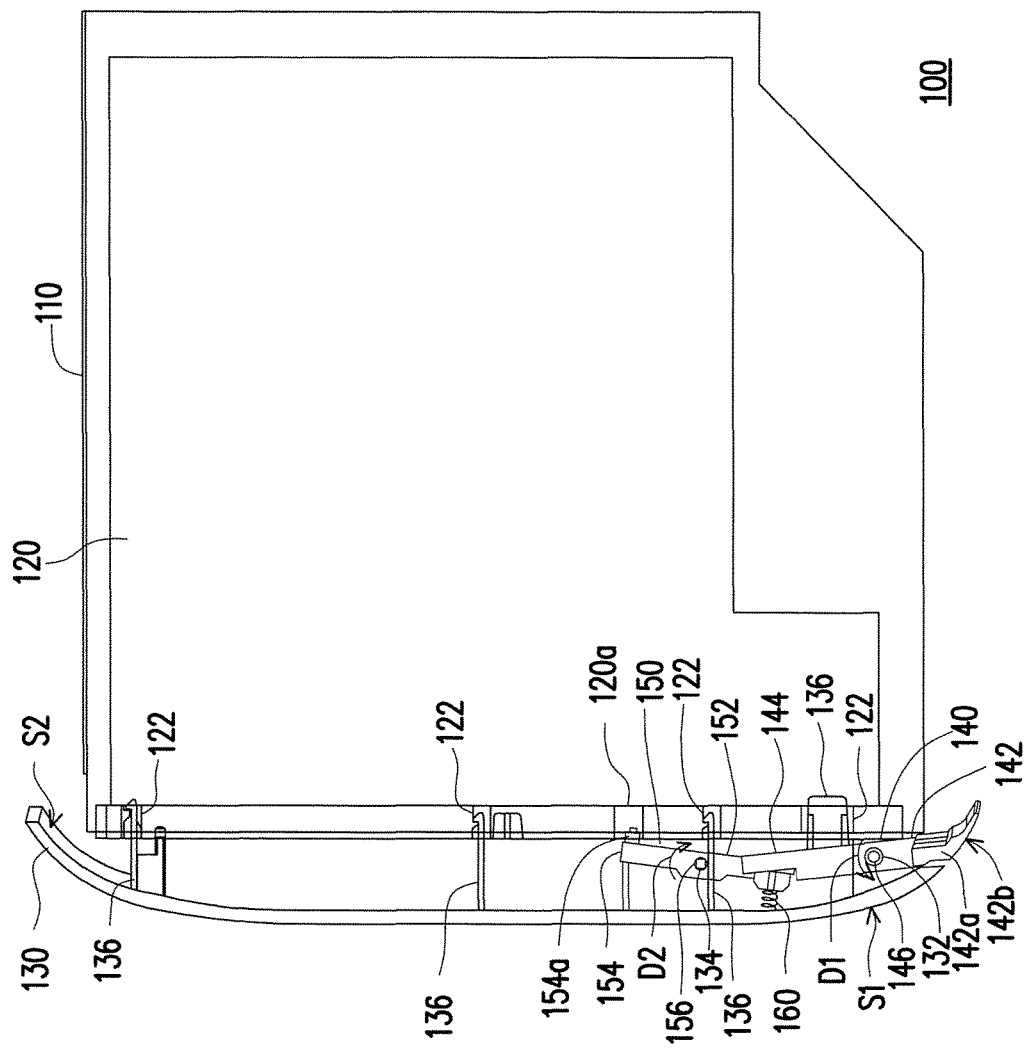
Figure 6:
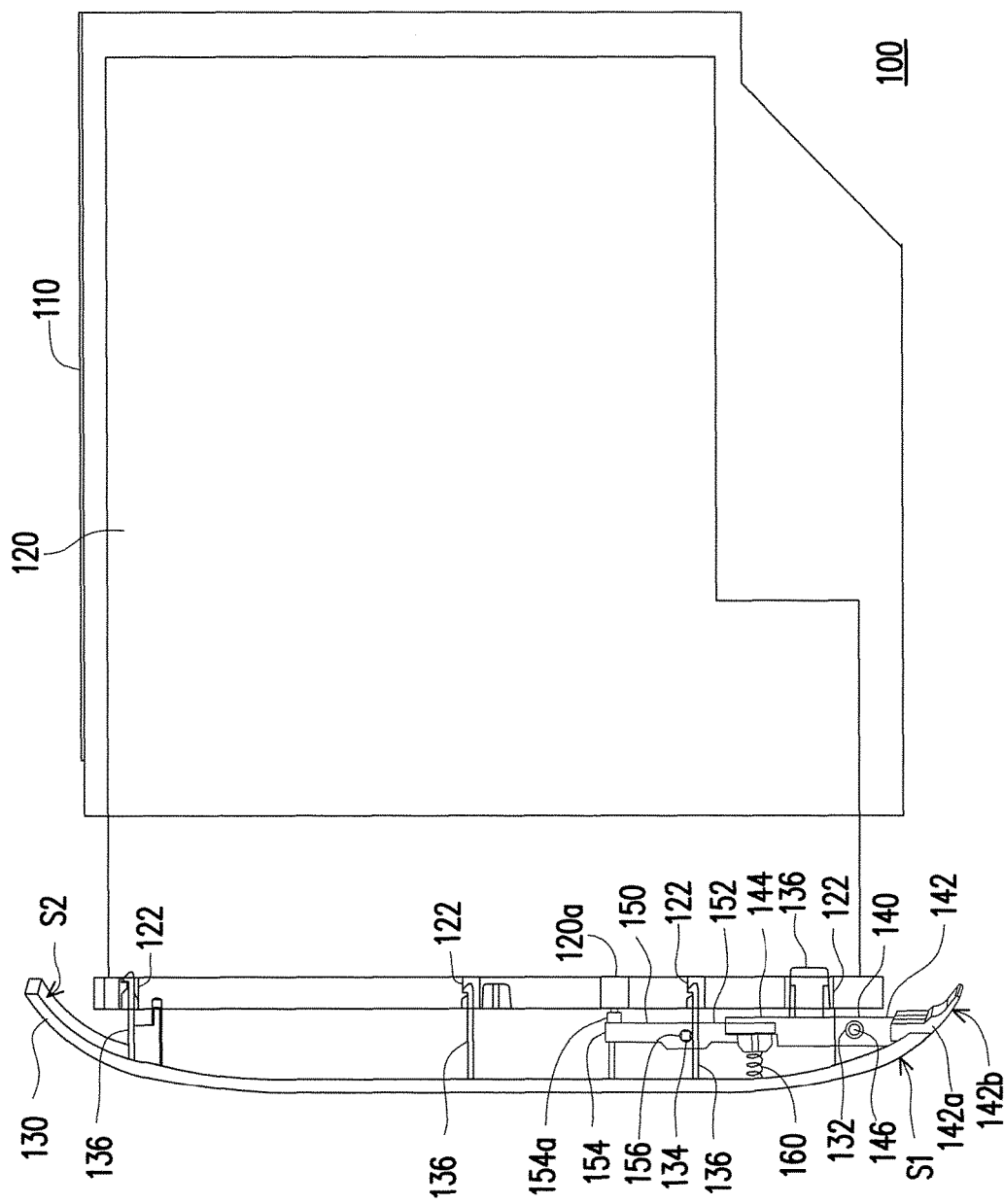

FIG. 2 is a schematic view of a panel in FIG. 1 from another view angle. FIG. 3 is a schematic front view of a portion of a panel in FIG. 2. FIG. 4 to FIG. 6 are schematic top views of a process of a tray in FIG. 1 moves out of a housing. In order to clearly illustrate relative locations among each of the elements, FIG. 3 to FIG. 6 are depicted in a transparent manner. Referring to FIG. 1 to FIG. 6, in the embodiment, the ODD 100 includes a housing 110, a tray 120, a panel 130, a first linkage 140, and a second linkage 150. The tray 120 may be movably disposed at the housing 110 to move into or move out of the housing 110. The panel 130 is connected to the tray 120 and the panel 130 is located at a side of the housing 110. The first linkage 140 may be rotatably disposed on the panel 130 and located between the housing 110 and the panel 130. The second linkage 150 may be rotatably disposed on the panel 130 and located between the first linkage 140 and the panel 130. By rotating the first linkage 140 with respect to the panel 130 in a first rotating direction D1, the second linkage 150 is pushed by the first linkage 140 and rotates with respect to the panel 130 in a second rotating direction D2 opposite to the first rotating direction D1 so as to actuate the tray 120 to move out of the housing 110.

Specifically, the housing 110 is assembled to a casing of an electronic device (e.g., a host of a desktop computer or a notebook computer) and the housing 110 has an opening configured for the tray 120 to move into or move out of the housing 110. The tray 120 may be movably disposed at the housing 110 and is configured to be adapted to hold an optical disk. After the tray 120 moves into the housing 110, the ODD 100 is able to read data from or write data to the optical disk placed on the tray 120. Next, after the tray 120 moves out of the housing 110, a user is able to remove the optical disk or replace the optical disk. The panel 130 is connected to the tray 120 and is exposed to the outside of the casing of the electronic device (e.g., a host of a desktop computer or a notebook computer). In the embodiment, the panel 130 may have a plurality of hooks 136, and the tray 120 may have a plurality of slots 122. The hooks 136 are respectively engaged with the slots 122, such that the panel 130 is fixed to the tray 120. In other embodiments, locations of the hooks and the slots may be switched. For instance, the hooks may be disposed on the tray, and the slots matching the hooks may be disposed on the panel.

As shown in FIG. 3 and FIG. 4, the first linkage 140 is located between the housing 110 and the panel 130 and located between the tray 120 and the panel 130. Furthermore, the first linkage 140 may have a first pivot 146, and the panel 130 may have a first groove 132 disposed correspondingly to the first pivot 146. The first linkage 140 may be engaged with the first groove 132 of the panel 130 through the first pivot 146 but maintains to be able to rotate freely with respect to the panel 130. In other embodiments, locations of the first pivot and the first groove may be switched. For instance, the first pivot may be disposed on the panel, and the first groove matching the first pivot may be disposed on the first linkage. On the other hand, the second linkage 150 is located between the first linkage 140 and the panel 130. The panel 130 may have a second pivot 134, and the second linkage 150 may have a second groove 156 disposed correspondingly to the second pivot 134. The second linkage 150 may be engaged with the second pivot 134 of the panel 130 through the second groove 156 but maintains to be able to rotate freely with respect to the panel 130. In other embodiments, locations of the second pivot and the second groove may be switched. For instance, the second groove may be disposed on the panel, and the second pivot matching the second groove may be disposed on the second linkage.

Referring to FIG. 2 to FIG. 6, the first linkage 140 may have a first end 142 and a second end 144 opposite to each other. The second linkage 150 may have a third end 152 and a fourth end 154 opposite to each other. The third end 152 of the second linkage 150 is located between the second end 144 of the first linkage 140 and the panel 130. The third end 152 is abutted against the second end 144. In the embodiment, the ODD further includes a restoring element 160. The restoring element 160 may be a compression spring or other suitable elastomers and is disposed between the panel 130 and the second linkage 150. Furthermore, two ends of the restoring element 160 are respectively abutted against the panel 130 and the third end 152. On the other hand, the fourth end 154 of the second linkage 150 also has a protruding portion 154a extending toward the tray 120. The tray 120 also has an actuating portion 120a (e.g., an electronic switch) aligned to the protruding portion 154a. When the second linkage 150 rotates with respect to the panel 130 in the second rotating direction D2, the protruding portion 154a moves close to the actuating portion 120a and abuts against the actuating portion 120a. A switch-on signal may be sent by the actuated actuating portion 120a to a control unit. A driving signal may be sent by the control unit receiving the switch-on signal to a driving unit to drive the tray 120 to move out of the housing 110.

In the embodiment, the first end 142 of the first linkage 140 may have a switch portion 142a. The switch portion 142a is disposed on a side of the panel 130. A user may press the switch portion 142a, such that the first linkage 140 and the second linkage 150 are driven to rotate with respect to the panel 130 respectively in different directions. The ODD 100 is thus actuated by the second linkage 150, and hence the tray 120 is able to move out of the housing 110. Specifically, the panel 130 may have a first surface S1 and a second surface S2 opposite to each other. The second surface S2 is located between the first surface S1 and the housing 110. Moreover, the first linkage 140, the second linkage 150, the restoring element 160, and the hooks 136 are located between the second surface S2 and the housing 110.

The first surface S1 is conformal with a pressing surface 142b of the switch portion 142a exposed outside of the panel 130, for example, the first surface S1 and the pressing surface 142b are coplanar or two arc surfaces being coplanar with each other. The first surface S1 is conformal with the pressing surface 142b of the switch portion 142a, such that, compared to existing ODDs, an opening hole configured to accommodate a button is not required on the ODD 100 provided by the embodiment. Thereby, the appearance of the ODD 100 remains intact; moreover, dust from external environment is prevented from entering into the ODD 100 to affect normal operations of the ODD 100. It is worth noting that a switch symbol is marked on the pressing surface 142b of the switch portion 142a, the user is thereby able to detect the location of the switch portion 142a.

FIG. 4 is a state of the ODD 100 provided by the embodiment before being activated. Meanwhile, the switch portion 142a leans on the panel 130. The second end 144 of the first linkage 140 is abutted against the third end 152 of the second linkage 150, and the restoring element 160 has not yet been deformed. FIG. 5 is a state of the ODD 100 being actuated. When the user presses the switch portion 142a, the first linkage 140 rotates along the first pivot 146 acting as the rotation axle with respect to the panel 130 in the first rotating direction D1. Meanwhile, the first end 142 of the first linkage 140 moves away from the panel 130, and the second end 144 moves close to the panel 130. Next, the second linkage 150 is pushed by the first linkage 140 and rotates along the second pivot 134 acting as the rotation axle with respect to the panel 130 in a second rotating direction D2. Meanwhile, the third end 152 of the second linkage 150 moves close to the panel 130, and the fourth end 154 moves away from the panel 130. The restoring element 160 is pushed by the third end 152 and thereby is elastically deformed (e.g. is compressed and deformed). As the fourth end 154 moves close to the tray 120, such that the protruding portion 154a disposed on the fourth end 154 may move close to the actuating portion 120a and abuts against the actuating portion 120a. In the embodiment, FIG. 6 is a state of the tray 120 of the ODD 100 moves out of the housing 110. After the actuating portion 120a is actuated, the tray 120 may move out of the housing 110. Alternately, if an external force applied to the switch portion 142a is removed, a recovery rate of the restoring element 160 may drive the second linkage 150 to rotate with respect to the panel 130 in a direction opposite to the second rotating direction D2. Moreover, the second end 144 of the first linkage 140 is pushed by the third end 152, such that the first linkage 140 rotates with respect to the panel 130 in a direction opposite to the first rotating direction D1, and consequently, a state before the first linkage 140 and the second linkage 150 begin functioning is recovered.

To sum up, in the ODD provided by the embodiments of the invention, the first linkage drives the second linkage to rotate with respect to the panel, such that the tray is actuated by the second linkage and moves out of the housing. Furthermore, the switch portion of the first linkage is exposed at a side of the panel. The pressing surface of the switch portion is conformal with the outer surface of the panel. When the user presses the pressing surface of the switch portion, the first linkage rotates with respect to the panel in the first rotating direction, such that the second linkage may be driven by the first linkage and rotates with respect to the panel in the second rotating direction. The first rotating direction is opposite to the second rotating direction. As such, the actuating portion on the tray is actuated by the second linkage, and that the tray moves out of the housing. Compared to existing ODDs, in the ODD provided by the embodiments of the invention, an opening hole configured to accommodate a button is not required. Thereby, the appearance of the ODD remains intact; moreover, dust from external environment is prevented from entering into the ODD to affect normal operations of the ODD.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:
1. An optical disk drive (ODD), comprising:
   a housing;
   a tray, movably disposed at the housing to move into or move out of the housing;
   a panel, connected to the tray and located at a side of the housing;
   a first linkage, rotatably disposed on the panel and located between the housing and the panel; and
   a second linkage, rotatably disposed on the panel and located between the first linkage and the panel,
   by rotating the first linkage with respect to the panel in a first rotating direction, the second linkage being pushed by the first linkage and rotating with respect to the panel in a second rotating direction opposite to the first rotating direction so as to actuate the tray to move out of the housing.

2. The ODD as claimed in claim 1, wherein the first linkage has a first end and a second end opposite to each other, the second linkage has a third end and a fourth end opposite to each other, and the third end is abutted against the second end.

3. The ODD as claimed in claim 2, wherein the fourth end of the second linkage has a protruding portion extending toward the tray, the tray has an actuating portion, the protruding portion is aligned to the actuating portion, and when the second linkage rotates with respect to the panel in the second rotating direction, the protruding portion moves close to the actuating portion to abut against the actuating portion.

4. The ODD as claimed in claim 2, wherein the first end of the first linkage has a switch portion, and the switch portion is disposed at a side of the panel.

5. The ODD as claimed in claim 4, wherein the panel has a first surface and a second surface opposite to each other, the second surface is located between the first surface and the housing, and the first surface is conformal with a pressing surface of the switch portion exposed outside of the panel.

6. The ODD as claimed in claim 1, further comprising:
   a restoring element, disposed between the panel and the second linkage, and the panel and the second linkage are respectively abutted against the restoring element.

7. The ODD as claimed in claim 6, wherein the restoring element is a compression spring.

8. The ODD as claimed in claim 1, wherein the first linkage has a first pivot, the panel has a first groove, and the first linkage is pivoted to the first groove of the panel through the first pivot.

9. The ODD as claimed in claim 1, wherein the panel has a second pivot, the second linkage has a second groove, and the panel is pivoted to the second groove of the second linkage through the second pivot.

10. The ODD as claimed in claim 1, wherein the panel has a plurality of hooks, the tray has a plurality of slots, and the hooks are respectively engaged with the slots such that the panel is fixed on the tray.

* * * * *